United States Patent [19]

Vogele

[11] 4,006,869
[45] Feb. 8, 1977

[54] CARGO HANDLING SYSTEM

[75] Inventor: Bruno Joseph Vogele, Kirkland, Wash.

[73] Assignee: The Boeing Company, Seattle, Wash.

[22] Filed: June 30, 1975

[21] Appl. No.: 591,785

[52] U.S. Cl. .......................... 244/137 R; 198/436; 340/163; 340/147 P; 214/16 R
[51] Int. Cl.² ...................... B64D 9/00; B64C 1/20
[58] Field of Search ........... 340/163, 147 R, 147 A; 244/137 R, 118 R; 104/88; 214/11, 12, 13, 14, 16 B, 16 R, 84; 198/38, 31; 212/DIG. 1

[56] References Cited

UNITED STATES PATENTS

| | | | |
|---|---|---|---|
| 2,684,218 | 7/1954 | Cozzoli | 244/137 R |
| 2,824,656 | 2/1958 | Renner | 244/137 R X |
| 3,592,333 | 7/1971 | Sullivan et al. | 198/31 X |
| 3,614,738 | 10/1971 | Slavin | 340/163 |
| 3,741,504 | 6/1973 | Alberti et al. | 244/137 R |
| 3,815,091 | 6/1974 | Kirk | 340/163 X |

FOREIGN PATENTS OR APPLICATIONS 1,271,534  8/1961  France ........................... 244/137 R Primary Examiner—Trygve M. Blix
Assistant Examiner—Galen Barefoot
Attorney, Agent, or Firm—H. Gus Hartmann

[57] ABSTRACT

The invention relates to dividing a cargo compartment area into zones that can be controllably selected from dual remote control points, so as to permit simultaneous and independent operation of power drive units (PDU's) in each zone for handling of cargo containers or pallets. Also, the method of cargo handling zone selection permits the regulation of the size or area under the control of each remote point. Further, the cargo handling control system allows for the independent load/unload operation from operator stations forward of the division line in conjunction with a first remote control panel, and from an operator station aft of the division line in conjunction with a second remote control panel.

7 Claims, 14 Drawing Figures

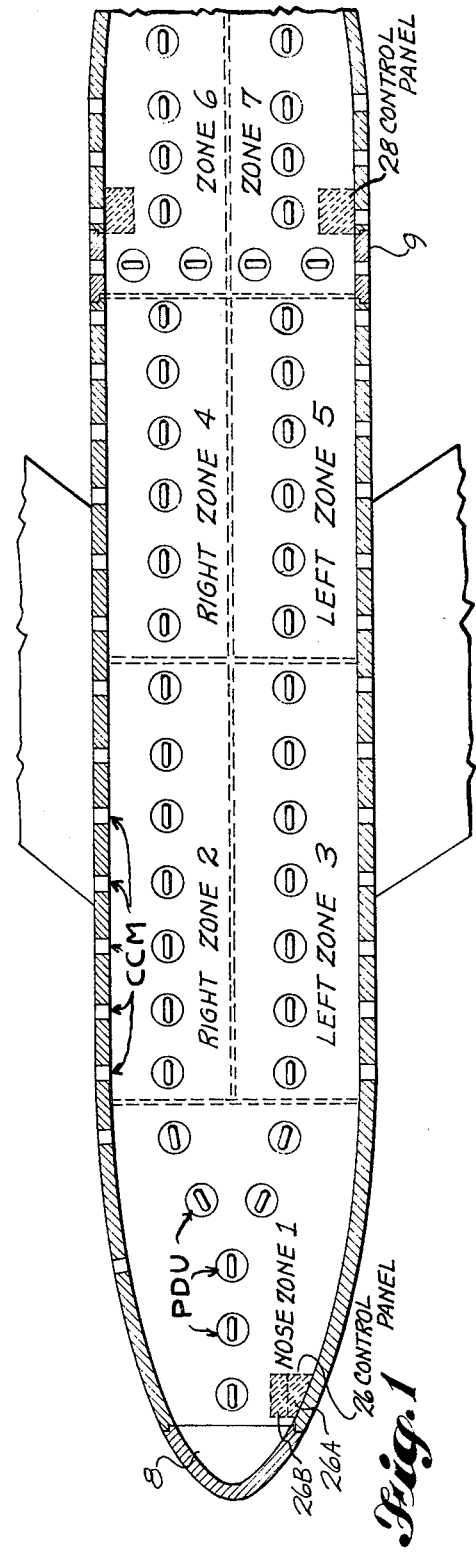
Fig.1
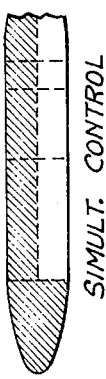 Fig.1A NOSE DOOR CONTROL ONLY
 Fig.1B SIMULT. CONTROL
Fig.1C SIMULT. CONTROL
Fig.1D SIMULT. CONTROL
Fig.1E SIMULT. CONTROL
Fig.1F SIMULT. CONTROL
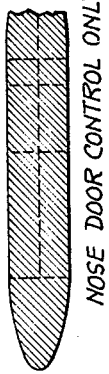 Fig.1G SIMULT. CONTROL
Fig.1H SIDE DOOR CONTROL ONLY
Fig.1I SIMULT. CONTROL

CARGO HANDLING SYSTEM

SUMMARY OF THE INVENTION

On an aircraft freighter having both a nose cargo door and an aft side cargo door, it is desirable to load the cargo containers and pallets through both doors simultaneously. Therefore, this invention relates to a control system which can selectively divide the cargo loading/unloading area into selectable control zones and in addition, permit the selection of the number of control zones to be handled by each of the remotely located control panels. Further, the control system permits simultaneous and independent loading/unloading operations through each of the control panels which have been selected to control the power drive units (PDU's) in each zone.

In general, the cargo handling system is operated as follows. To load or unload cargo out of an area, two cargo operators are required: a so-called loadmaster, who is stationed at one of the master cargo control panels adjacent an entry area; and an assistant cargo loader, who is stationed at any one of the cargo control modules (CCM's). The CCM is a logic circuit control device for controlling each power drive unit (PDU) to which it is adjacently positioned.

In the aircraft, when particular cargo loading or unloading area zones are selected, a zone division line is generally indicated by a light on the sidewall of the fuselage adjacent the division line separating the selected zones from those unselected.

For loading cargo into the aircraft, the loadmaster at the entryway area arms the loading operation by actuating his lever control switch, which is on the master cargo control panel, and positions this lever to the load position, which is a maintained position. With this lever in the load position, a load arming signal is sent to all CCM's within the selected zones, which will permit the assistant cargo loader to operate all of the PDU's from the entryway area, up to the CCM station where he is located. This then permits all of the PDU's to be operated for driving the cargo in a direction such that the cargo is driven towards the assistant cargo loader. The reason for this is safety, in that the person who has the cargo coming towards him, should be in control of its movement. Further, the system is set up such that any-one of two persons can interrupt the cargo handling operation: the loadmaster, by moving his switch on the master cargo control panel out of its load arming position; and the assistant cargo loader, by releasing his spring-loaded or deadman switch.

An object of the invention is to divide a cargo compartment into selectable control zones and permitting simultaneous independent operation of the power drive units (PDU's) in each zone from dual remote control points.

Other objects and advantages of the invention will be more clearly understood from the following description when read with reference to the accompanying drawings.

BRIEF DESCRIPTION OF THE DRAWINGS

FIG. 1 is a schematic plan view of a typical cargo compartment in an airplane showing power drive units, labeled as PDU's spaced throughout the cargo floor area for moving cargo containers and pallets; and also shows a seven zone division arrangement for cargo handling control.

FIGS. 1A to 1I are schematic illustrations in plan view of some of the various arrangements of selection of the divided zones which are available with the seven zone division arrangement shown in FIG. 1 for commanding the power drive unit system.

NOMENCLATURE

Figure 2:
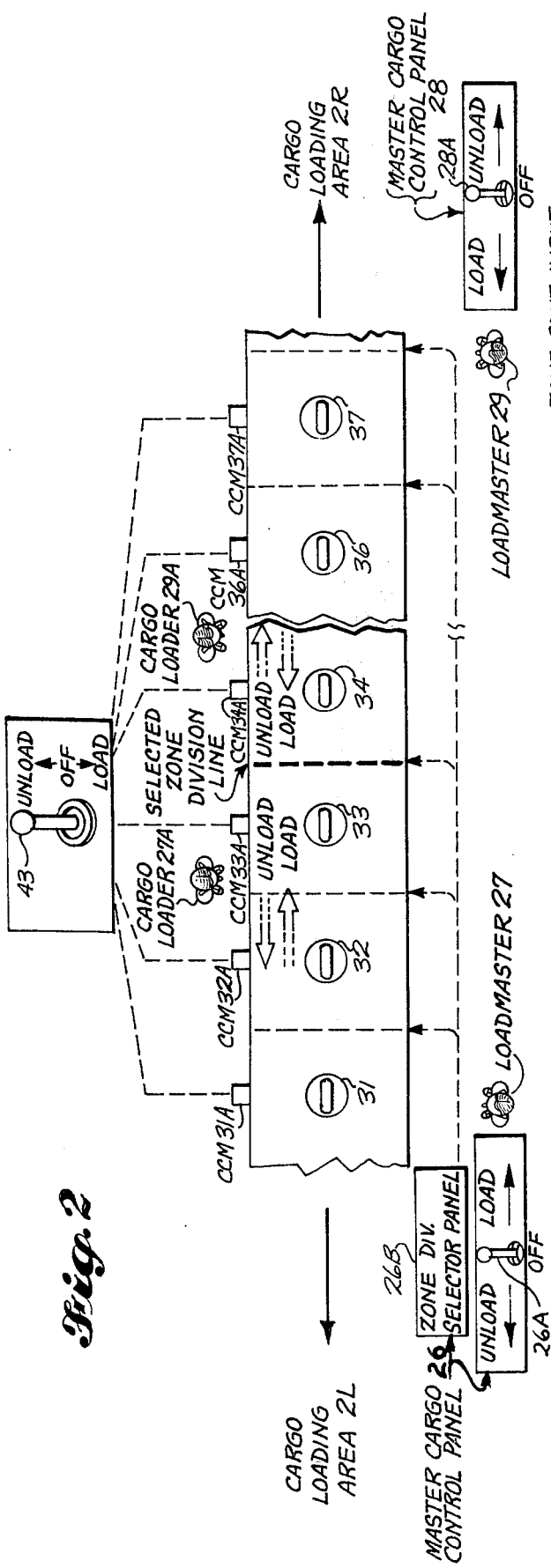
FIG. 2 is an illustrative example of the selectable cargo division system shown in a schematic plan view depicting just one row of power drive units with a selected zone division shown in a heavy dashed line; and is representative of those portions of the partitioned cargo area adjacent one of the dividing lines shown in FIG. 1.

PDU: The power drive unit is an electrically powered rubber tired wheel which protrudes out of the compartment floor and provides two-directional motive power to move cargo.

CCM: The cargo control module is an electrical switching device associated with a power drive unit (PDU). It transmits to the associated PDU forward and aft command signals either received from adjacent CCM's, or generated by the control switch if it is in the proper position and a required arming signal is present. The CCM also switches forward and aft command signals to adjacent CCM's unless the control switch is in a configuration preventing such transmittal. The CCM further generates an unload arm signal if the control switch is in the proper position and one of the unload control input signals is present.

ZDL: The zone division logic is an electrical device which performs control signal switching functions at each selectable zone division. If a zone division is selected, the device associated with that zone division receives a zone division selector input signal which accomplishes the isolation between inputs and outputs of the load and unload arm signals preventing those signals from reaching adjacent ZDL's. It further diverts the unload control signals to the adjacent cargo control module within the selected zone. All devices not associated with a selected zone division do not receive a zone division selector input signal in which case all inputs are connected to their corresponding outputs permitting the signals to reach the adjacent ZDL's.

PWR: The power source.

AND gate is a logic circuit which has two or more signal inputs and both signal inputs have to be present in order to get a signal output.

OR gate is a logic circuit which has two or more signal inputs and if either one or both of the signal inputs is present, there is a signal output.

NOT gate is a logic circuit which inverts the signal, i.e. if there is a signal energy input, there is a minimum or zero signal energy output; also, if there is no signal energy input, then the NOT gate produces a signal energy output.

DETAILED DESCRIPTION OF THE DRAWINGS

FIG. 1 shows a typical cargo compartment in an airplane having both a nose cargo door 8 and a side cargo door 9 for allowing cargo loading/unloading through both doors at the same time. Power drive units (PDU's) are installed at regular spaced intervals throughout the floor of the cargo compartment for moving the cargo containers and pallets in either a forward or an aft direction. Each PDU is operable through a cargo control module (CCM) adjacent thereto.

The airplane cargo compartment is divided into seven cargo control zones: zone 1 in the nose section of the fuselage; zone 2 on the right side and forward of the midsection; zone 3 on the left side and forward of the midsection; zone 4 on the right side and aft of the midsection; zone 5 on the left side of the aft midsection; zone 6 on the right aft section; and zone 7 on the left aft section. Cargo operation in zone 1 is controlled solely from control panel 26 and the cargo operation in the remaining zones 2 to 7 may be controlled from either the nose door control panel 26 or the side door control panel 28.

FIG. 1 with respect to the loading cargo into zone 1, when the loadmaster, who is stationed at the master cargo control panel 26 adjacent the nose door entrance way, actuates his zone division selector 26B by selecting zone 1, two independent control zones will be set up by the zone division logic (ZDL) devices, i.e one on either side of the division line between zone 1 and zones 2, 3. It should be noted that the ZDL's are only required in locations where zone division is desirable. With this zone division line, when the loadmaster moves his control lever 26A to the load position, then the assistant cargo loader can operate any one of the CCM's within zone 1 by positioning his control lever on a CCM to the load position. This will result in the PDU adjacently associated with the actuated CCM, and all those PDU's forward thereof, to rotate in a direction such that the cargo is moved from the nose door entrance way toward the rear of the aircraft fuselage, or in the load direction. Also, with respect to the movement of the cargo within zones 2, 3 adjacent to zone 1, and assuming that the second loadmaster stationed at the master control panel 28 adjacent the side-door entrance way also activates the loading operation of zones 2, 3 by moving his control lever 28A to the load position; then, the second assistant cargo loader can operate any one of the CCM's within zones 2, 3 by positioning its control lever to the load position. This will rotate the adjacently associated PDU and all those PDU's aft thereof, such that the cargo will be driven from the side-door entrance way towards the front of the aircraft fuselage or in the loading direction for zones 2, 3.

To unload the cargo, the sequence of whether the loadmaster or the assistant cargo loader operates all of the PDU's from the entry way area up to the station where the assistant cargo loader is stationed, is reversed. Because it is desirable from a safety standpoint that the operator who has the cargo coming towards him be the person having the movement of the cargo under his control, and also actuating the momentary or deadman type switch. Only one three position control switch (LOAD/OFF/UNLOAD) is required on each individual CCM to perform the basic cargo handling operations in either zone. The cargo zone division concept, therefore, keeps the cargo loader's tasks standardized anywhere in the cargo compartment, independent of a particular zone selection mode. Therefore, at any one of the local CCM stations along the inside wall of the fuselage, adjacent to a PDU, the assistant cargo loader can position his control lever to the unload position for the cargo unloading operation; and by doing this he then enables the loadmaster at the master cargo control panel, to position this lever to the unload position and thereby operate all of the PDU's in the selected zones under his control from the one armed by the assistant cargo controller, to the doorway exit.

FIG. 2 is a schematic illustration of the selectable cargo zone division concept of this invention; wherein the area in the immediate vicinity of each of the PDU's represents an area zone somewhat equivalent to the seven area zones shown in the plan view of FIG. 1.

With the zone selector system, it is possible to have as many two-man crews on the airplane as there are cargo loading entrance ways, e.g. for an aircraft cargo compartment having a nose door, a side door, and an aft door or tail gate type loading ramp, three such crews could separately handle the cargo in the compartment area.

FIG. 2 depicts a two crew operation, i.e. a loadmaster 27 for the left cargo loadng area 2L and his assistant, cargo loader 27A; and a loadmaster 29 for the right cargo loading area 2R and his assistant, cargo loader 29A. With two crews and two master cargo control panels 26 and 28 for controlling the cargo through two different entrance ways, it is also desirable that the cargo compartment area be divided into two control authority operator zones; and the zone division selector 26B on the master cargo control panel 26 makes this possible through logic circuits by drawing a division line between any one of the selected zones. In the illustration of FIG. 2, each of the PDU's 31–37 could represent an area zone having multiple PDU's and of the size of any one of the seven area zones shown in FIG. 1. Assuming, as shown in FIG. 2, that the division line between PDU's 33 and 34, shown by the heavy dashed line, has been selected, then the cargo handling area is divided in two. The thinner dashed lines indicate other possible selections that could have been made. The cargo to the left of the selected zone division line, including PDU's 31–33 in area 2L, is then under the control authority of loadmaster 27 and his assistant cargo loader 27A; and the cargo to the right of the selected zone division line, including PDU's 34–37 in area 2R, is then under the control authority of loadmaster 29 and his assistant cargo loader 29A. Therefore, with respect to area 2L, if the cargo loader 27A moved the control lever 43 of the CCM 33A to the unload position, this would arm the three PDU's 31–33 for driving the cargo to the left for unloading. With respect to area 2R, if the cargo loader 29A moved the control lever 43 of CCM 34A to the unload position, this would arm the PDU's 34–37, shown to the right of the zone division line, to rotate in the direction so as to drive the cargo to the right to unload. Further, it will be understood that had the loadmaster 27 selected additional zones such as 34 or 35 to the right of the zone division line shown by the heavy dashed line, then of course those PDU stations which are now part of area 2R would then have become part of area 2L.

Figure 3:
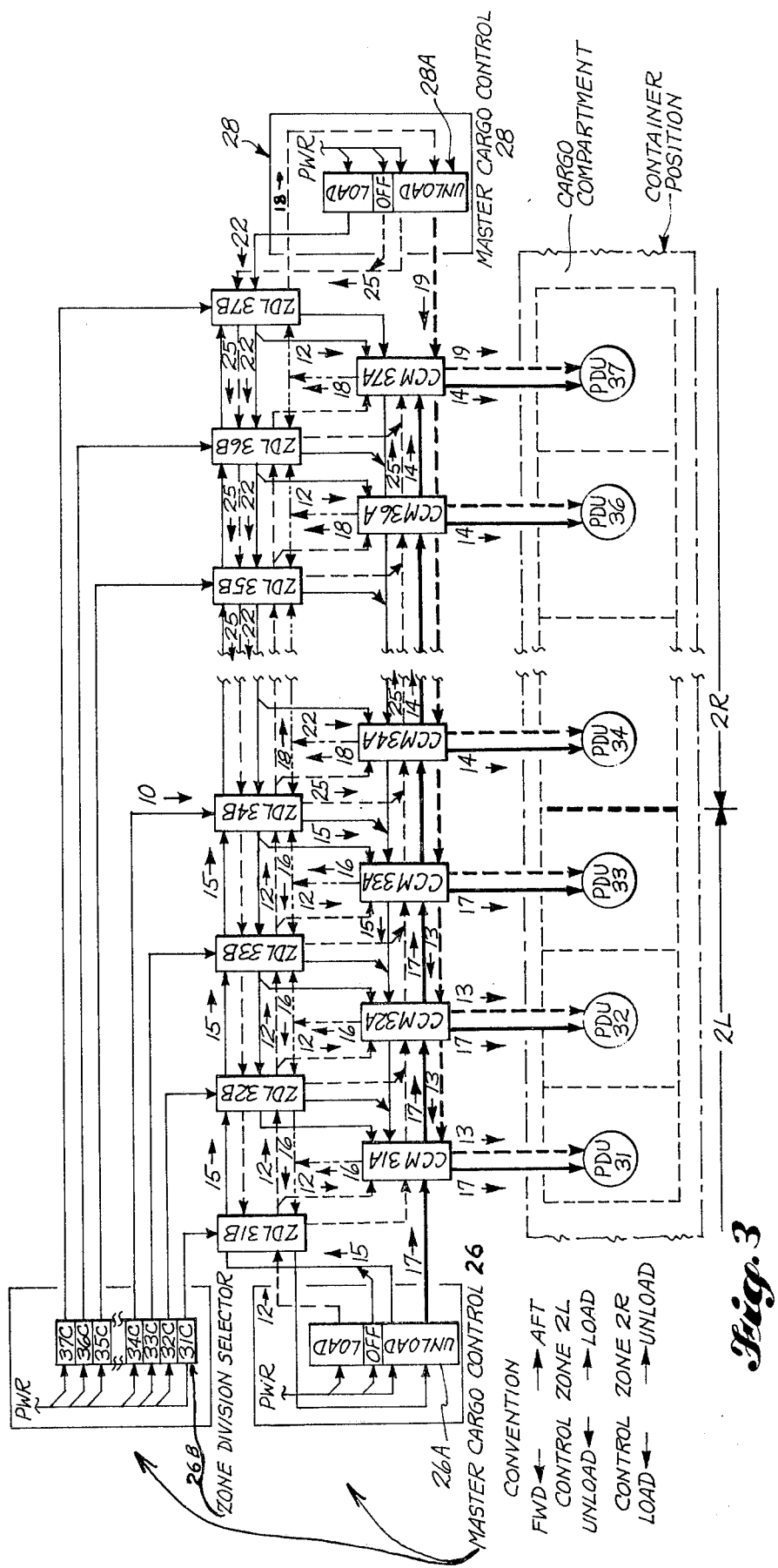
FIG. 3 is a logic flow block diagram for the selectable cargo zone division system shown in the illustrative example of FIG. 2, and depicts the zone division logic boxes, labeled ZDL, and the cargo control modules, labeled CCM.

In FIG. 3, the flow diagram will be described with respect to selecting zone 34C on the zone division selector 26B. This will provide a signal 10 to ZDL 34B, which will result in the cargo area being divided between PDU's 33 and 34; thereby situating PDU's 31, 32, and 33 within the area controlled by the master cargo control panel 26; and PDU's 34 through 37 to be controlled from the master cargo control panel 28. The functions of the ZDL will be herein after described in greater detail with respect to FIG. 5.

Having selected the zone division between PDU 33 and 34, and established cargo areas 2L and 2R, with the direction to the left in FIG. 3 being toward the nose or forward in the aircraft fuselage and the direction to the right being aft, a loading operation will now be described.

To load cargo into area 2L, which loading movement of cargo is towards the right in FIG. 3, the loadmaster stationed at master cargo control panel 26 will have to move his control lever 26A to the load position. This will produce a load arming signal 12 which is a light dashed line that identifies an arming function for aft rotation of the PDU's in cargo area 2L. The signal 12 flows: through ZDL 31B and also CCM 31A; through ZDL 32B and also CCM 32A; through XDL 33B and also CCM 33A; and then to ZDL 34B. When the signal 12 comes to ZDL 34B, it will not be able to go through because of signal 10 from the zone division selector 26B resulting from having selected zone 34C. This is more clearly shown in FIG. 5.

Figure 5:
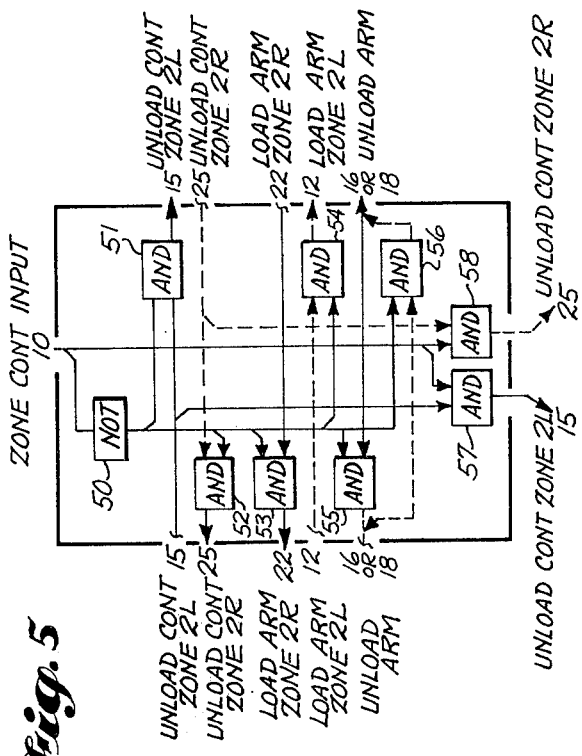
FIG. 5 is a detailed diagram of the logic circuit of the zone division logic, labeled as ZDL, shown in FIG. 3.

FIG. 5 shows the details of the zone division logic (ZDL) module. The load arming signal 12 entering the left hand side of the ZDL will not be able to leave the ZDL because of the AND gate 54 function that was acquired due to the presence of the zone division selector input signal 10. That is, if an input signal 10 from the zone division selector 26B is present at ZDL 34B, there cannot be an exit of a load arming signal 12 out of ZDL 34B. Likewise, the absence of a zone division selector signal 10 at a ZDL module, would automatically enable the load arming signal 12 to go through AND gate 54 to the next ZDL. Stated more specifically, in FIG. 3, the zone division selector 26B is capable of providing only one signal for energizing only one of the ZDL's and no more; and as shown, ZDL 34B is the module being energized by the signal 10. Now, with respect to FIG. 5, this zone division selected energy signal 10 comes into the top of the ZDL module, and enters the NOT logic gate 50. As soon as this energy signal 10 is present at the NOT gate 50, the signal energy output leaving the NOT gate 50 disappears or goes to zero. Therefore, the load arming signal 12 entering the ZDL module from the left as shown in FIG. 5, and entering the AND gate 54, will be interrupted from going on to further ZDL's because no signal entering the AND gate 54 will be able to exit as long as any one of its two input signal energies is at zero.

Therefore, with respect to FIG. 3, with the master cargo control lever 26A in the load position, a load arming signal 12 will be present at CCM 31A, CCM 32A, CCM 33A, and at none of the other CCM's. It will be understood of course, that if a zone division selector signal 10 had not been selected for ZDL's 31B to 34B, then the load arming signal 12 would have continued to go through the CCM 34A and onward until a ZDL had received a zone division selector signal. If none of the ZDL's receives a zone division selector signal or just the last one, then of course the entire cargo area 2L and 2R could be controlled for loading from the master control panel 26.

Figure 4:
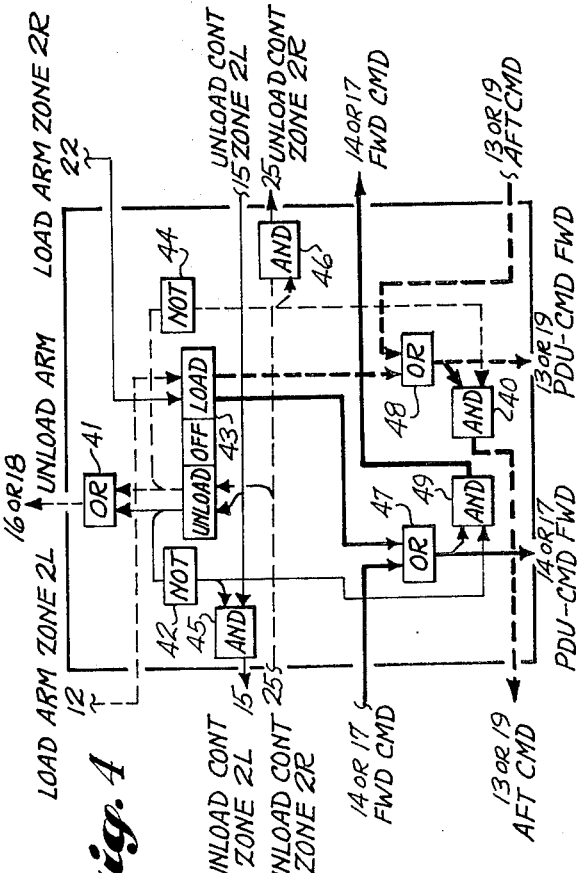
FIG. 4 is a detailed diagram of the logic circuit of the cargo control module, labeled CCM, shown in FIG. 3.

Returning now to the cargo loading operation into area 2L; the CCM's 31 to 33 now have a load arming signal 12 input; and for an understanding of how the assistant cargo loader 27A stationed adjacent to CCM 33A will be able to command the loading operation from PDU 33 and forward thereof in area 2L, it will be necessary to refer to FIG. 4.

The cargo control module is an electrical switching device associated with a power drive unit (PDU). If: a zone 2L load arming signal 12 is present at the input of the device called CCM and the cargo control switch 43 is in the load position; or, an aft command signal 13 or 19 entering the right side of the CCM is present, then a PDU aft rotation command signal is transmitted to the associated PDU. The signal is also transmitted to the aft command output, shown at the left side, unless the control switch 43 is in the unload position and a zone 2R unload control signal 25 entering the left side of the CCM is present. If: a zone 2R load arming signal 22 is present at the input of the CCM and the cargo control switch 43 is in the load position; or, forward command signal 14 or 17 entering the left side of the CCM is present, then a PDU forward rotation command signal is transmitted to the associated PDU. The signal is also transmitted to the forward command output, shown at the right side, unless the control switch 43 is in the unload position and a zone 2L unload control signal 15 entering the right side of the CCM is present.

Further, if the control switch 43 is in the unload position and either the zone 2L or zone 2R unload control signal 15 or 25 is present, then an unload arm signal 16 or 18 is transmitted to the adjacent ZDL's.

FIG. 4 shows the details of a cargo control module (CCM); and coming into the CCM at the upper left hand corner of the figure, is the load arming signal 12 from the zone division selector 26B. This signal 12 comes to the lever control switch 43; and when the assistant cargo loader 27A operates this switch 43, from the off position to the load position, this then enables the load arming signal 12 to become a command signal which is identified by a heavy dashed line that goes to the OR gate 48. This load arming signal 12 then leaves the OR gate 48 and goes to PDU 33 for directing it to rotate in a direction such that the cargo is moved in an aft direction. Also, this load arming signal 12 leaving the OR gate 48, goes to the AND gate 40. Also entering the AND gate 40 is a signal coming from the NOT gate 44. The general function of a NOT gate is that if there is an energy signal input, then there will be no energy signal output; and likewise, if there is not energy signal input, then the NOT gate will produce an energy signal output. Therefore, the function of the NOT gate 44 is just to check whether or not the lever control switch 43 is in the unload position, and since the switch 43 is already in the load position, there will be no signal entry therefrom into the NOT gate 44. With not signal energy entry to the NOT gate 44, there will be a signal energy output produced therefrom to the AND gate 40. Therefore, the AND gate 40 will have a signal energy output as soon as the lever control switch 43 is moved to the load position; this signal output is identified as an aft command signal 13, and as shown in FIG. 3, goes to CCM 32A, where it comes in at the lower right hand corner thereof, and which as seen in referring back to FIG. 4, is also identified as an aft command signal 13, and is shown as coming in at the same relative location as that of CCM 32A. In FIG. 4, in the lower right hand corner, the aft command signal 13 is now an input signal to the OR gate 48, which is now CCM 32A; and this signal 13 leaving the OR gate 48, goes to the PDU 32 for directing it to rotate in a direction so as to move the cargo aft. Also, this signal 13 leaving the OR gate 48, continues in a like manner as that previously described, through AND gate 40, to enter the next CCM 31A. This sequence continues on through all of the other CCM's and PDU's, forward of the station that has been commanded; so that, all of the PDU's forward of the one initially selected will get a command signal 13 for rotating in the direction to move the cargo aft for the loading operation into area 2L which had been selected on the zone division selector 26B by the loadmaster 27. This completes the explanation of how the cargo is loaded into area 2L from the master cargo control panel 26.

Now, assuming that at the same time that the cargo loading operation is in progress in area 2L, that a cargo loading operation in area 2R is desired. Therefore, for a cargo loading operation in area 2R, a second loadmaster 29 will have to be stationed at the second master control panel 28; and he will have to move his lever control switch 28A to the load position. This will produce a load arming signal 22, which is shown as a light solid line in the drawing, and identifies an arming function for forward rotation of the PDU's in cargo area 2R. In order to load cargo, from an aft entrance way into area 2R, the wheels of the PDU's engaging the undersurface of the cargo containers or pallets, will have to rotate so as to move the cargo in a forward direction, i.e. toward the nose of the aircraft fuselage, or to the left in FIG. 3.

The signal 22, which is now an arming signal for forward rotation, is initiated at the second master control switch 28A, and flows: through ZDL 37B and also CCM 37A; through ZDL 36B and also CCM 36A; etc.., until the signal 22 comes to ZDL 34B. At ZDL 34B, the signal 22 will not be able to go through because of the signal 10 from the zone division selector 26B that divides the cargo area between PDU 33 and PDU 34. The reason for the signal 22 not being able to go through ZDL 34B is the same as that explained before for cargo area 2L, and will be more clearly understood with reference to FIG. 5.

The zone division logic is an electrical device which performs control signal switching functions at each selectable zone division. At the selected zone division the device receives and input signal 10 entering on top. Zone 2L unload control signal 15 entering the left side is then switched to the adjacent cargo control module within zone 2L, and the zone 2R unload control signal 25 entering the right side of the ZDL is switched to the adjacent cargo control module within zone 2R. Load and unload arm signals zone 2L 12 and 16 entering the left side, and load and unload arm signals zone 2R 22 and 18 entering the right side are isolated from their respective outputs. At all zone divisions which are not selected the input signal 10 is not present at the ZDL. Zone 2L unload control signal 15, load arm signal 12 and unload arm signal 16 all entering the left side are switched through to their corresponding outputs on the right side from where they are connected to the adjacent ZDL to the right. Zone 2R unload control signal 25, load arm signal 22 and unload arm signal 18 all entering the right side are switched through to their corresponding outputs on the left side from where they are connected to the inputs of the adjacent ZDL to the left.

FIG. 5 shows the details of the zone division logic (ZDL) module. As shown, the load arming signal 22 from the cargo loading area 2R enters the right hand side of the ZDL and goes to the AND gate 53. For those ZDL's not receiving the signal 10 from the zone division selector 26B at the NOT gate 50, the signal energy output leaving the NOT gate 50 increases or goes to a maximum. Therefore, with both the load arming signal 22 and the signal energy of NOT gate 50 entering the AND gate 53, the load arming signal 22 will be uninterrupted from going on to further ZDL's and CCM's because a signal entering the AND gate 53 will be able to exit if both of its two input signal energies are at a maximum. However, when the load arming signal 22 reaches the selected ZDL 34B, it will not be able to go any further to CCM 33A because of the presence of the zone division selector signal 10. With respect to the NOT gate 50, if there is a signal input thereto there is no signal energy output. Therefore, all of the AND gates 51–56 for the selected ZDL 34B will be closed or deactivated such that no signal can pass through.

When the assistant cargo loader, adjacent any of the CCM's 34A to 37A etc.., through which the load arming signal 22 can go through, operates as shown in FIG. 4, the lever control switch 43 on the CCM to the load position, then the load arming signal 22 entering the upper right hand corner of the CCM shown in FIG. 4 can go through the control switch 43. This signal then leaves control switch and becomes a command signal which is identified by a heavy solid line that goes through the OR gate 47, to the PDU for rotation in the direction to drive the cargo forward with respect to the aircraft compartment. This command signal 14 from OR gate 47 will also go through the AND gate 49 because the AND gate 49 is open for the signal to pass through, unless the lever control switch 43 is in the unload position. So, the signal 14 goes through the AND gate 49 and exits from the right side of the CCM as a forward command signal 14. This command signal 14 then goes into the left side of the next CCM, aft in the fuselage, where it now appears as a forward command input signal 14. The signal 14 then passes through OR gate 47 of this CCM and goes to its PDU, and then further exits through AND gate 49 etc..

In summarizing the system operation thus far, referring to FIG. 3, because of the zone division selector signal 10 and the selected zone division logic unit ZDL 34B, the load arming signal 12 and 22 from the master cargo control panels 26 and 28 respectively, are stopped so that they cannot pass the zone division line between PDU's 33 and 34. Further, the load arming signals 12 and 22 in either area 2L or 2R, will enable the same lever control switch on the CCM to operate the PDU's in either: the forward direction, if the CCM is in the aft cargo area 2R; or in the aft direction, if the CCM is in the forward cargo area 2L. Therefore, the operators handling the loading operation do not have to remember whether the PDU's should rotate one way or the other. The only thing the operators have to do is to move their control lever into either the load or unload position; and the logic system takes care of the rest.

The operation of the system for unloading cargo will now be described, assuming still as shown in FIGS. 2 and 3, that the loading area 2L has been selected by the operation of the zone division selector 26B in selecting ZDL 34B; thereby providing the zone division line between PDU's 33 and 34.

In general, the unloading operation is initially armed at the CCM's adjacent to the PDU's, and the unloading operation is commanded at the master cargo control panels adjacent to the doorway exits of the fuselage; because the person at the doorway exit should be the one in command of the unloading operation, since he can see the cargo coming out towards him and can also see where the cargo is going to after it exits the aircraft.

With respect to the cargo to be unloaded from area 2L, which is to the left of the zone division line shown by the heavy dashed line between PDU's 33 and 34, if on the master cargo control panel 26 the lever control switch 26A, as shown in FIG. 3, is not in the load position, then a so-called unload control signal 15 goes to ZDL 31B. As shown on the left hand side of the ZDL in FIG. 5, this unload control signal 15 enters AND gate 51, and goes on through to the next ZDL 3B; because as previously described, with no zone division select signal 10 entering the NOT gate 50, the NOT gate 50 will produce a maximum signal energy output that will go to all of the AND gates, and open or enable all of the AND gates 51 to 56 in the ZDL to pass a signal through. Therefore, with respect to AND gate 51, the maximum signal energy output from NOT gate 50 when combined with the unload control signal 15, will permit the signal 15 to pass through the unselected ZDL units.

Referring to FIG. 3, the unload control signal 15 leaving ZDL 31B will go through, in like manner, ZDL 32B, ZDL 33B, until it reaches the selected ZDL 34B. Referring to FIG. 5, with ZDL 34B being selected, there is a signal 10 present at NOT gate 50 which will produce a minimum or zero energy signal output therefrom, so that the unload control signal 15 will not appear at the output of AND gate 51. However, due to a branch line of the unload control signal 15 going to AND gate 57, and also a branch line of signal 10, the AND gate 57 will be opened and thereby permit an unload control signal 15 output from the left underside of the ZDL unit. So, at the selected ZDL 34B, the unload control signal 15 does not appear at the output end of AND gate 51 as previous ZDL's 31B, 32B, 33B, but instead appears at the output of AND gate 57. Referring to FIG. 3 and ZDL 34B, this unload control signal 15 leaving the left underside of the ZDL unit, enters the right hand side of CCM 33A. Now referring to the CCM schematic diagram in FIG. 4, this unload control signal 15 enters on the right hand side and goes to the AND gate 45 and a branch of the signal 15 enters the lever control switch 43. If the lever control switch 43 is not in the unload position, the NOT gate 42 will produce a maximum signal energy output to the AND gate 45, thereby permitting the unload control signal 15 to go through AND gate 45 and appear, in FIG. 3, as an output signal 15 exiting from the upper, left hand side of CCM 33A. This unload control signal 15 leaving CCM 33A will go through, in like manner, CCM 32A until it reaches CCM 31A. So, in effect, if none of the CCM's 34A and 33A have their lever control switch 43 in the unload position, then the unload control signal 15 will appear at each one of the lever control switches 43 of the CCM's 31A to 33A.

When the assistant cargo loader, adjacent to PDU 33, moves the lever control switch 43 on CCM 33A to the unload position, referring to FIG. 4, and with the input of unload control signal 15, there will be a signal input to the OR gate 41. Therefore, an unload arming signal, now referenced as 16, will exit from the top of CCM 33A and, as shown in FIG. 3, will enter both ZDL 33B and ZDL 34B.

With respect to this unload arming signal 16 entering the lower left hand side of the selected ZDL 34B, as shown in FIG. 5, it will enter AND gate 56, but because the selected zone division signal 10 is present at the NOT gate 50, the AND gate 56 cannot let the signal 16 go through.

Now referring to FIG. 3, with respect to the unload arming signal 16 entering the lower right hand side of ZDL 33B, as shown in FIG. 5, it will enter AND gate 55, which as previously stated will let the signal 16 go through, if the zone division signal 10 is not present at the NOT gate 50. Therefore, the unload arming signal 16 that comes into ZDL 33B on the lower right hand side, will go through AND gate 55 and continue on towards ZDL 32B; and in like manner, pass through ZDL 32B and ZDL 31B, to the unload side of the master cargo control switch 26A.

Now, as shown in FIG. 3, when the loadmaster moves his lever control switch 26A to the unload position, this will generate an unload command signal 17 that will enter the left side of CCM 31A. As shown in FIG. 4, this unload command signal 17 passes through OR gate 47, to PDU 31 and causes it to rotate so as to drive the cargo forward in the compartment. In FIG. 4, the unload command signal 17 leaving OR gate 47 also enters AND gate 49, and as long as the CCM switch 43 is not in the unload position, the unload command signal 17 goes through to the next CCM 3A rotating PDU 32, in like manner, until the signal 17 enters CCM 33A. Now, CCM 33A is the one at which the assistant cargo loader has moved the lever control switch 43 on CCM 33A to the unload position for initially arming the circuit for the unloading operation. Therefore, as shown in FIG. 4, when the unload command signal 17 enters the left hand side of the CCM and goes through OR gate 47 to both the PDU 33 and the AND gate 49, the signal 17 cannot continue on to the next CCM through AND gate 49, due to the control switch 43 being in the unload position. The unload position of switch 43 sends a signal to NOT gate 42 which then emits a minimum or zero energy signal to AND gate 49, which in effect, blocks the unload command signal 17 from going through. Therefore, in reference to FIG. 3, there will be no unload command signal 17 from cargo area 2L, going over the zone division line to PDU's in the area 2R.

With respect to the simultaneous unloading of cargo from the area 2R, which is to the right of the zone division line, as shown in FIG. 3, by the heavy dashed line between PDU's 33 and 34. On the second master control panel 28, when the lever control switch 28A is not in the load position, then a so-called unload control signal 25 goes to ZDL 37B. Referring to FIG. 5 for ZDL 37B, the unload control signal 25 comes in on the right hand side of the ZDL unit, and enters both the AND gate 52 and the AND gate 58. With no zone division select signal 10 entering NOT gate 50 as previously described, the AND gate 58 will be closed and the NOT gate 50 will produce a maximum signal energy output to the AND gate 52, which when combined with the unload control signal 25, will permit signal 25 to pass through the unselected ZDL units and finally arrive at the selected ZDL 34B. With the zone division select signal 10 being present at ZDL 34B, referring to FIG. 5, the AND gate 52 will be closed and the AND gate 58 will be open to permit the unload control signal 25 to leave ZDL 34B at the bottom and enter the upper left hand side of CCM 34A. Referring to FIG. 4, the unload control signal 25 will enter the AND gate 46, and, if the control switch 43 is not in the unload position, the unload control signal 25 will go through AND gate 46 and continue on towards the CCM's to the right, as shown in FIG. 3, so that there is an unload control signal 25 appearing at each one of the control switches 43 of all the CCM's in the cargo area 2R.

Now, assuming that the unloading operation in cargo area 2R is to take place from PDU 34 to the aft exit way, and that there is an unload control signal 25 present, then if the assistant cargo loader, adjacent to CCM 34A, moves the lever control switch 43 of CCM 34A to the unload position, referring to FIG. 4, an unload arming signal 18 will leave from OR gate 41, exiting from the top of CCM 34A.

Referring to FIG. 3, the unload arming signal 18 will enter the right hand side of ZDL 34B and also, the left hand side of ZDL 35B. Referring to FIG. 5 and what takes place at ZDL 34B, the unload arming signal 18 entering on the right hand side of the ZDL unit, goes to AND gate 55. Assuming that ZDL 34B has been selected as the zone division line, then the signal 10 is present at the top of ZDL 34B; thereby closing the AND gate 55, and stopping the unload arming signal 18 from going through. Now, as to what takes place at ZDL 35B, with the unload arming signal 18 entering on the left hand side, referring to FIG. 5, the signal 18 will enter AND gate 56. With no zone division select signal 10 entering NOT gate 50 as previously described, the AND gate 56 will be open and let the signal 18 go through. Therefore, the unload arming signal 18, in like manner, will pass through ZDL 36B and ZDL 37B to the unload side of the second master cargo control switch 28A. Now, as shown in FIG. 3, when the second loadmaster moves his lever control switch 28A to the unload position, this will generate an unload command signal 19, as shown by a heavy dashed line, that will enter the right hand side of CCM 37A. Referring to FIG. 4, this unload command signal 19 will pass through OR gate 48 to PDU 37 and causes the wheels of the unit to rotate in a direction so as to drive the cargo aft within the compartment. Referring to FIG. 4, this unload command signal 19 leaving OR gate 48, also enters AND gate 40, and as long as the CCM switch 43 is not in the unload position, the unload command signal 19 will continue on through to the next CCM 36A, where it will rotate PDU 36 in like manner to that of PDU 37; and from there the 19 will continue until it enters on the right hand side of CCM 34A. Now This CCM 34A is the one at which the assistant cargo loader moved the lever control switch 43 to the unload position for initially arming the circuit for the unloading operation. Therefore, as shown in FIG. 4, when the unload command signal 19 enters the right hand side of OR gate 48, and goes through to both the PDU 34 and the AND gate 40, the signal 19 cannot continue on to the next CCM through AND gate 40, due to the control switch 43 being in the unload position. This unload position of switch 43, sends a signal to NOT gate 44, which then emits a minimum or zero signal energy output to the AND gate 40 that in effect closes the AND gate 40 and thereby blocks the unload command signal 19 from going on through. Referring to FIG. 3, there will, therefore, be no unload command signal 19 leaving CCM 34A in cargo area 2R, and going over the zone division line to the PDU's in cargo area 2L.

While the invention has been disclosed with reference to a presently preferred embodiment, it is to be understood that those modifications and changes which become obvious to a person skilled in the art as a result of the teachings hereof, will be encompassed by the following claims.

What is claimed is:

1. A cargo handling control system, for permitting simultaneous loading and unloading of cargo through two entryways of a single cargo compartment, comprising; a first master controller for controlling cargo through a first entryway; a second master controller for controlling cargo through a second entryway remotely located with respect to the first entryway; a multiplicity of power drive units on the floor of the cargo compartment for moving cargo between the entryways; a cargo control module directly associated with each of the individuals power drive units; a zone division logic operatively interconnected between said cargo control module and the master controllers for permitting the arbitrary selection of a zone division line between any adjacent pair of power drive units to automatically set up two cargo control zones, one on either side of the arbitrarily selected zone division line, with each of said zones being controllable independently of each other by only one of the master controllers; said zone division logic in conjunction with said cargo control module, delegating the operating control of the power drive units in each of the two independently controllable zones to the respective master controller associated with the entryway in that zone, for controlling the direction of rotation of the power drive units.

2. A cargo handling control system, for permitting simultaneous loading and unloading of cargo through two entryways of a single cargo compartment, comprising: a multiplicity of power drive units on the floor of the cargo compartment for moving cargo between the entryways; a primary controller for controlling cargo through a first entryway; a secondary controller for controlling cargo through a second entryway remotely located with respect to the first entryway; a cargo control module means directly associated with said power drive units; a zone division logic means operatively interconnected between said cargo control module means and said primary and secondary controllers for permitting the arbitrary selection of a zone division line between any adjacent pair of said power drive units to automatically set up two cargo control zones, one on either side of the arbitrarily selected zone division line with each of said zones being controllable independently of each other by only one of the controllers; and said cargo control module means controlling the direction of rotation of the power drive units in each of said independently controllable zones, depending upon the loading and unloading operating signal received from the primary or secondary controller associated with the control of cargo through the entryway in that zone.

3. A cargo handling control system, for permitting simultaneous loading and unloading of cargo through two entryways of a single cargo compartment, comprising: a multiplicity of power drive units on the floor of the cargo compartment for moving cargo between the entryways; a primary controller for controlling cargo through a first entryway; a secondary controller for controlling cargo through a second entryway remotely located with respect to the first entryway; a zone division logic means operatively associated with said primary and secondary controller and said power drive units for permitting the arbitrary selection of a zone division line between any adjacent pair of said power drive units and for automatically setting up two cargo control zones, one on either side of the arbitrarily selected zone division line, with each of said znes being controllable independentally of each other by only one of the controllers; and cargo control module means directly associated with each of the individual power drive units in each of the selected zones and operatively interconnected between the said zone division logic means and said primary and secondary controller for receiving a power drive unit operating signal from said primary or secondary controller associated with the entryway in that zone, and controlling the direction of rotation of the associated power drive unit.

4. A cargo handling control system, for permitting simultaneous cargo loading and unloading through two remote doorways of a single cargo compartment, comprising: a multiplicity of power drive units positioned at spaced intervals throughout the floor of the cargo compartment for moving cargo; a first master controller adjacent to a first doorway for controlling cargo therethrough; a second master controller adjacent to a second doorway for controlling cargo therethrough; a zone division selector operatively associated with said first master controller and with each of said power drive units for permitting the arbitrary selection of a zone division line between any adjacent pair of power drive units, and transmitting a zone division signal; a zone division logic operatively interconnected between said zone division selector and each of said power drive units for receiving the zone division signal and automatically setting up two cargo control zones, one on either side of the arbitrarily selected zone division line, with each of said zones being controllable independently by only one of the master controllers; said zone division logic transmitting a power drive unit activating signal for delegating the operating control of the individual power drive units in each of the zones to the respective remotely located master controller; and a cargo control module connected directly to each of the said power drive units in each of the zones and operatively interconnected between said zone division logic and said master controllers for receiving the power drive unit activating signal from said zone division logic and in conjunction with receiving an input signal from the master controller, transmitting a direction of rotation operating signal to the associated power drive unit for moving cargo in the desired direction.

5. A cargo handling control system, for permitting simultaneous loading and unloading of cargo through two entryways of a single cargo compartment, comprising: a first master controller for controlling cargo through a first entryway; a second master controller for controlling cargo through a second entryway remotely located with respect to the first entryway; a multiplicity of power drive units on the floor of the cargo compartment for moving cargo between the entryways a cargo control module directly associated with each of the individual power drive units and operatively connected to said master controllers; a zone division logic operatively interconnected between said cargo control module and the master controllers for permitting the arbitrary selection of a zone division line between any adjacent pair of power drive units to automatically set up two cargo control zones, one on either side of the arbitrarily selected zone division line, with each of said zones being controllable independently by only one of the master controllers; said zone division logic delegating the operating control of the power drive units in each of the two independently controllable zones to the respective master controller and cargo control module associated with that control zone, for controlling the direction of rotation of the power drive units.

6. A cargo handling system, for permitting simultaneous cargo unloading through two remote cargo compartment exits of a single cargo compartment, comprising: a multiplicity of power drive units on the floor of the cargo compartment. for moving cargo between the exits; a first master controller for controlling cargo unloading through a first exit; a second master controller for controlling cargo unloading through a second exit; a multiplicity of cargo control module means each being directly associated with a power drive unit and operatively connected to said master controllers; a zone division logic means operatively interconnected between said cargo control module means and said master controllers for permitting the arbitrary selection of a zone division line between any adjacent pair of said power drive units, to automatically set up two cargo unload control zones, one on either side of the arbitrarily selected zone division line, with each of said zones being controllable independently of each other by only one of the master controllers; said zone division logic means delegating the operating control of the individual power drive units in each of the zones to the remotely located master controller associated with the exit in that zone; said cargo control module means transmitting an unload arming signal to the master controller of the selected independently controllable zone, permitting that master controller in return to send a power drive actuating signal to the cargo control module means and its associated power drive unit located between the exit and the arbitrarily selected zone division; and said cargo control module means transmitting said unload arming signal, for moving cargo from said cargo control module means toward the exit of the selected zone.

7. A cargo handling system, for permitting simultaneous cargo loading through two remote entryways of a single cargo compartment, comprising: a multiplicity of power drive units on the floor of the cargo compartment for moving cargo between the entryways; a first master controller for controlling cargo loading through a first entryway; a second master controller for controlling cargo loading through a second entryway; a multiplicity of cargo control module means each being directly associated with a power drive unit and operatively connected to said master controllers; a zone division logic means operatively interconnected between said cargo control module means and said master controllers for permitting the arbitrary selection of a zone division line between any adjacent pair of said power drive units, to automatically set up two cargo load control zones, one on either side of the arbitrarily selected zone division line, with each of said zones being controllable independently of each other by only one of the master controllers; said zone division logic means delegating the operating control of the individual power drive units in each of the zones to the remotely located master controller associated with the entryway in that zone; said master controller transmitting a load arming signal to cargo control module means within the selected independently controllable zone, permitting an actuated cargo control module means within said selected independently controllable zone in return to send a power drive actuating signal to power drive units located between the entryway of the selected independently controllable zone and said actuated control module means for moving cargo from the entryway of the selected independently controllable zone towards said actuated cargo control module means.

* * * * *